US011638233B2

(12) United States Patent
Shin et al.

(10) Patent No.: US 11,638,233 B2
(45) Date of Patent: Apr. 25, 2023

(54) REFINED LOCATION ESTIMATES USING ULTRA-WIDEBAND COMMUNICATION LINKS

(71) Applicant: Google LLC, Mountain View, CA (US)

(72) Inventors: Dongeek Shin, Santa Clara, CA (US); Steven Benjamin Goldberg, Los Altos Hills, CA (US); Shahram Izadi, Tiburon, CA (US)

(73) Assignee: Google LLC, Mountain View, CA (US)

( * ) Notice: Subject to any disclaimer, the term of this patent is extended or adjusted under 35 U.S.C. 154(b) by 2 days.

(21) Appl. No.: 17/196,093

(22) Filed: Mar. 9, 2021

(65) Prior Publication Data

US 2022/0295443 A1 Sep. 15, 2022

(51) Int. Cl.
*H04W 64/00* (2009.01)
*G01S 5/02* (2010.01)
*G01S 13/02* (2006.01)

(52) U.S. Cl.
CPC ......... *H04W 64/003* (2013.01); *G01S 5/0284* (2013.01); *G01S 13/0209* (2013.01)

(58) Field of Classification Search
None
See application file for complete search history.

(56) References Cited

U.S. PATENT DOCUMENTS

2019/0135229 A1  5/2019  Ledvina et al.
2021/0072373 A1* 3/2021  Schoenberg .......... G01S 13/765

OTHER PUBLICATIONS

Alarifi, et al., "UltraWideband Indoor Positioning Technologies: Analysis and Recent Advances", May 2016, 37 pages.
Garello, et al., "Peer-to-Peer Cooperative Positioning: Part II: Hybrid Devices with GNSS & Terrestrial Ranging Capability", Jul. 2012, pp. 56-64.
MacGougan, et al., "Tightly-coupled GPS/UWB Integration", Jan. 2010, 22 pages.
Solomon, et al., "Collision Prediction from UWB Range Measurements", Oct. 9, 2020, 12 pages.

* cited by examiner

*Primary Examiner* — Adolf Dsouza
(74) *Attorney, Agent, or Firm* — Colby Nipper PLLC (57) ABSTRACT

This document describes systems and techniques to generate refined location estimates using ultra-wideband (UWB) communication links. Mobile devices, such as smartphones, include location sensors to estimate their location. The accuracy of location sensors is generally about 3 meters (or about 10 feet). More accurate location data would allow mobile devices to provide new and improved functionality. The described systems and techniques determine the distance between nearby mobile devices using UWB communication links. A mobile device can then use the distance between the mobile devices to determine their relative locations. By comparing the relative locations of the mobile devices with their location estimates, the mobile device can generate a refined location estimate.

10 Claims, 6 Drawing Sheets

REFINED LOCATION ESTIMATES USING ULTRA-WIDEBAND COMMUNICATION LINKS

BACKGROUND

Many mobile devices (e.g., smartphones) include location sensors (e.g., global positioning systems (GPS), global navigation satellite systems (GNSS)) to estimate their current location. Various applications on a mobile device can use the location estimates to provide services and functionalities (e.g., navigation). The location estimates are generally accurate to about 3 meters (about 10 feet), which can worsen if the mobile device is located indoors or in a dense urban area. This accuracy level is often insufficient for many functionalities or applications that rely on the location estimates. For example, these functionalities may not be able to determine whether a user is inside a store, which room the user is located within, or on which street the user is walking when using the location sensor of the mobile device.

SUMMARY

This document describes systems and techniques to generate refined location estimates using ultra-wideband (UWB) communication links. Mobile devices, such as smartphones, include location sensors to estimate their location. The accuracy of location sensors is generally about 3 meters (or about 10 feet). More accurate location data would allow mobile devices to provide new and improved functionality. The described systems and techniques determine the distance between nearby mobile devices using UWB communication links. A mobile device can then use the distance between the mobile devices to determine their relative locations. Based on the relative locations of the mobile devices with their location estimates, the mobile device can generate a refined location estimate with greater accuracy by comparing.

This Summary introduces simplified concepts of systems and techniques to generate refined location estimates using UWB communication links, the concepts of which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of systems and techniques to generate refined location estimates using UWB communication links are described in this document with reference to the following drawings. The same numbers are used throughout the drawings to reference like features and components.

DETAILED DESCRIPTION

This document describes systems and techniques to generate refined location estimates using UWB communication links in mobile devices. Mobile devices generally include a location sensor to estimate their current location. The location estimates are generally accurate to about 3 meters (about 10 feet). The described systems and techniques, however, can use UWB communication links among nearby mobile devices to estimate the distance between them. A mobile device can use the distance between nearby mobile devices to determine their relative locations. The mobile device can then refine the location estimates by comparing the relative locations with the location estimates. If a small number of nearby mobile devices are present (e.g., ten), the location accuracy can increase from about 3 meters to less than a meter.

Figure 1:
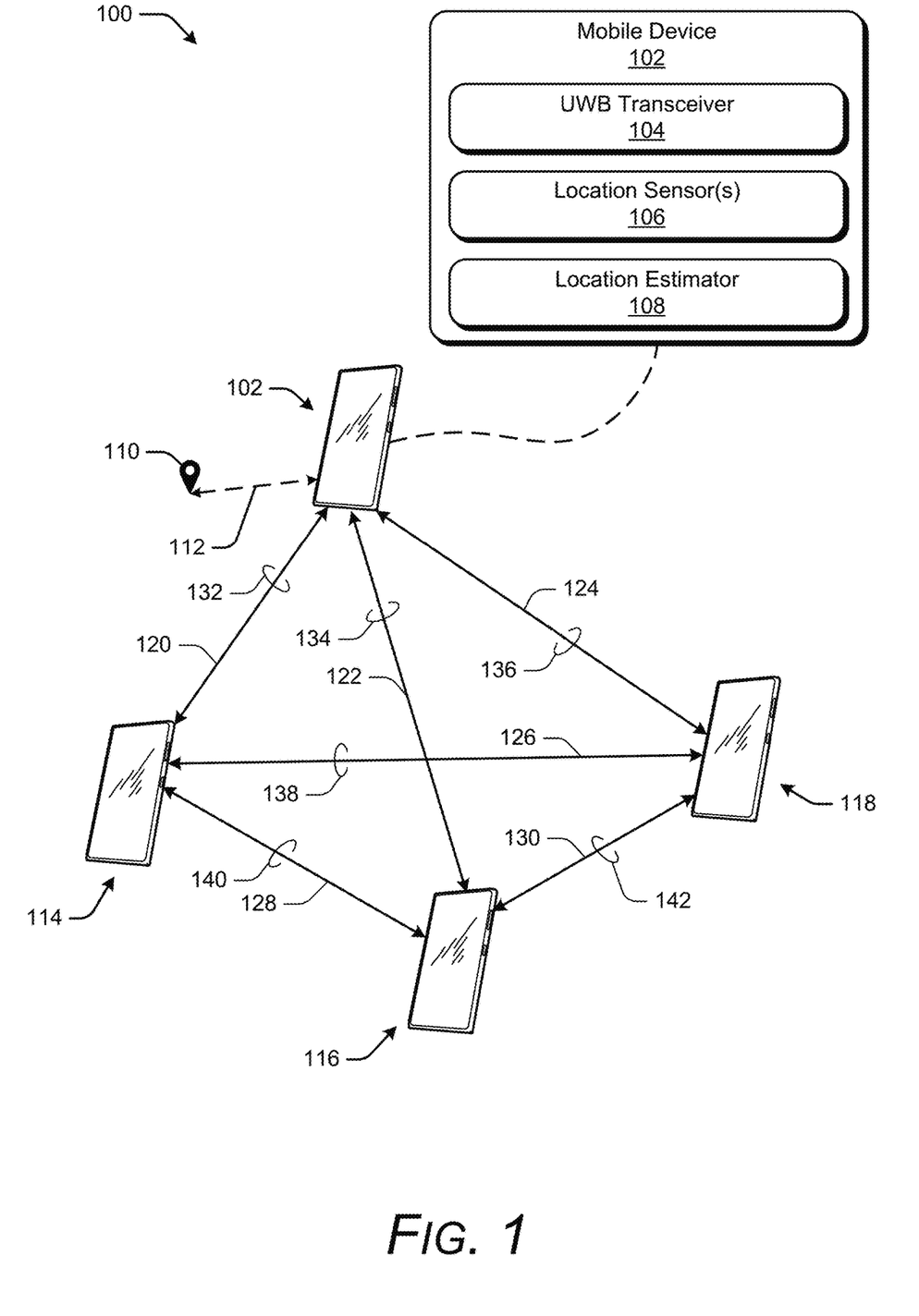
FIG. 1 illustrates an example environment in which a mobile device can generate refined location estimates using UWB communication links.

FIG. 1 illustrates an example environment 100 in which a mobile device 102 can generate refined location estimates using UWB communication links. The environment 100 and the mobile device 102 may include additional devices and components omitted from FIG. 1 for the sake of clarity.

The mobile device 102 includes a UWB transceiver 104, one or more location sensors 106, and a location estimator 108. The mobile device 102 can use the UWB transceiver 104 to establish communication links with nearby devices, including mobile devices 114, 116, and 118, using UWB radio technology. In aspects, the mobile devices 114, 116, and/or 118 may be configured similar to or different from the mobile device 102. The mobile device 102 can configure the UWB transceiver 104 and supporting circuitry (e.g., antennas, front-end modules, amplifiers) to frequency bands defined by communication standards for UWB communications.

For example, the mobile device 102 can use the UWB transceiver 104 to establish a communication link using UWB communication standards with the mobile devices 114, 116, and 118. In particular, the mobile device 102 can establish a UWB communication link 120 with the mobile device 114, a UWB communication link 122 with the mobile device 116, and a UWB communication link 124 with mobile device 118. Similarly, the mobile device 114 can establish a UWB communication link 126 with the mobile device 118 and a UWB communication link 128 with the mobile device 116. The mobile device 116 can establish a UWB communication link 130 with the mobile device 118. Generally, the mobile device 102 can establish respective UWB communication links with devices within about 200 meters.

The mobile device 102 can exchange data 132 over the UWB communication link 120 with the mobile device 114. The data 132 can include a respective location estimate for the mobile devices 102 and 114, the distance between the mobile device 114 and other nearby mobile devices (e.g., the mobile devices 116 and 118), and an identifier for the mobile device 114. Similarly, the mobile device 102 can exchange data 134 and 136 with the mobile devices 116 and 118, respectively, over the UWB communication links 122 and 124, respectively. The mobile device 114 can exchange data 138 and 140 with the mobile devices 116 and 118, respectively, over the UWB communication links 126 and 128, respectively. The mobile device 116 can exchange data 142 with the mobile device 118 over the UWB communication link 130.

The location sensors 106, for example, can include a global positioning system (GPS) or a global navigation satellite system (GNSS) sensor that can determine a location estimate 110 of the mobile device 102. Alternatively or additionally, the location senor 106 can provide location data or GNSS data for various functionalities or components of the mobile device 102. For example, the location estimator 108 can use the location data from the location sensors 106 to determine the location estimate 110. As described above, the location sensors 106 provide an estimated location of the mobile device with an accuracy of about 3 meters. Under adverse conditions, such as urban canyons or indoors, the accuracy of the location sensors 106 may degrade, resulting in accuracies in excess of 3 meters (e.g. 5-10 meters). As illustrated in FIG. 1, the location estimator 108 provides a location estimate 110 with a geometric margin of error 112 from the actual location of the mobile device 102. If the mobile device 102 is located indoors, under foliage, or in an urban canyon, the location estimate 110 is less accurate or the geometric margin of error 112 is larger.

The location estimator 108 can determine the relative location of nearby devices using UWB communication links (e.g., the UWB communication links 120 through 130) and generate a refined location estimate of the mobile device 102. The mobile device 102 can include the location estimator 108 as hardware, software, or a combination thereof. The location estimator 108, when executed by a processor of the mobile device 102, causes the mobile device 102 to generate refined location estimates using the UWB communication links 120 through 130. For example, the location estimator 108 can use the UWB communication link 120 to determine the distance between the mobile devices 102 and 114. Similarly, the location estimator 108 can use the UWB communication links 122 and 124 to determine the distance to the mobile devices 116 and 118.

The mobile device 102 can also obtain the distance between nearby mobile devices. For example, the mobile device 102 can obtain the distance between the mobile devices 114, 116, and 118. For example, the mobile device 102 can obtain the distance data from one or more mobile devices over the UWB communication links or an online database. The mobile device 102 can also obtain the location estimates for the mobile devices 114, 116, and 118.

In some aspects, the mobile device 102 (or mobile devices 114, 116, or 118) may only use and share the location data (e.g., the location estimate 110) after the mobile device 102 receives explicit permission from a user of the mobile device 102. For example, in situations discussed above in which the mobile device 102 may collect and share location data, the mobile device 102 may provide individual users with an opportunity to provide input to control whether programs or features of the mobile device 102 can collect and use the information. The mobile device 102 may further allow the individual users to control what the programs or features can or cannot do with the location data. Engineers may also program the location estimator 108 to share anonymized location data by removing data that can link the location estimate 110 with the mobile device 102 or a user thereof. In this way, another mobile device cannot determine the identity of the mobile device 102 (or mobile devices 114, 116, or 118) or the user thereof.

The location estimator 108 can use the distance between the mobile devices 102, 114, 116, and 118 to determine their relative locations. The location estimator 108 can then compare the relative locations of the mobile devices 102, 114, 116, and 118 to their location estimates to generate a refined location estimate for the mobile device 102. The accuracy of the refined location estimate generally improves as respective UWB communication links are established with more mobile devices.

Figure 2:
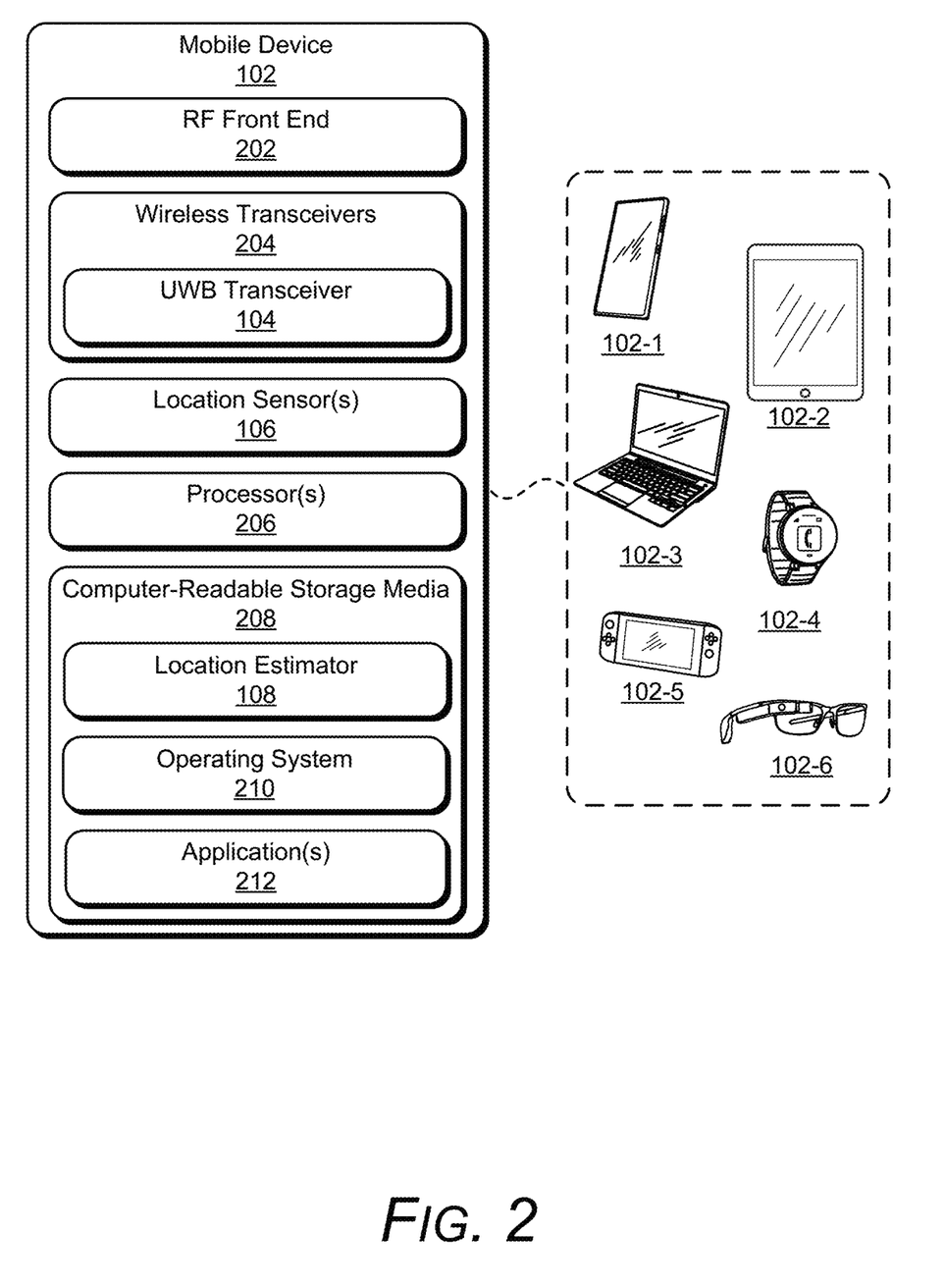
FIG. 2 illustrates an example device diagram of a mobile device that can generate refined location estimates using UWB communication links.

FIG. 2 illustrates an example device diagram 200 of a mobile device 102 that can generate refined location estimates using UWB communication links. In this example, the mobile device 102 includes additional components than those illustrated in FIG. 1. Alternatively or additionally, the mobile device 102 may represent other mobile devices 114, 116, 118, and so forth involved with determining refined location estimates as described herein. The mobile device 102 can include additional components, which are not illustrated in FIG. 2.

Generally, the mobile device 102 can be implemented as one of a variety of consumer electronic devices. As non-limiting examples, the mobile device 102 can be a mobile phone 102-1, a tablet device 102-2, a laptop computer 102-3, a computerized watch 102-4, a portable video game console 102-5, computerized glasses 102-6, a wearable device, a vehicle-based computing system, and the like.

The mobile device 102 includes antennas (not illustrated), a radio frequency (RF) front end 202, and wireless transceivers 204. The antennas of the mobile device 102 may include an array of antennas configured similarly to or different from each other. The RF front end 202 can couple or connect the wireless transceivers 204 to the antennas to facilitate various wireless communication types, including UWB communication. The antennas and the RF front end 202 can be tuned to, or be tunable to, one or more frequency bands defined by communication standards (e.g., UWB communication standards) and implemented by the wireless transceivers 204 to support transmission and reception of communications with other mobile devices (e.g., the mobile device 114).

The wireless transceivers 204 include the UWB transceiver 104 for communicating with nearby mobile devices (e.g., the mobile devices 114, 116, and 118) using UWB communication links (e.g, the UWB communication links 120, 122, and 124). The wireless transceivers 204 may also include one or more additional wireless transceivers (e.g., a Long Term Evolution (LTE) transceiver, Fifth Generation New Radio (5G NR) transceiver, or Sixth Generation (6G) transceiver) for communicating with base stations in the New Radio Radio Access Network (NR RAN) and/or the Evolved Universal Terrestrial Radio Access Network (E-UTRAN). The wireless transceivers 204 may also include one or more additional transceivers for communicating over one or more local wireless networks (e.g., wireless local area network (WLAN), wireless personal area network (WPAN), Bluetooth™, near-field communication (NFC), Wi-Fi-Direct, IEEE 802.15.4, mmWave, sub-mm-Wave, radar, lidar, sonar, ultrasonic) with another mobile device or local network entity.

The mobile device 102 includes the location sensor 106 (as described above) and may also include other various sensors (not shown) to detect various environmental or system properties of the mobile device 102 such as temperature, movement, orientation, supplied power, power usage, battery state, or the like. As such, the sensors of the mobile device 102 may include any one or a combination of temperature sensors, accelerometers, inertial measurement units, gyroscopes, thermistors, battery sensors, and power usage sensors.

The mobile device 102 also includes one or more processors 206 and a hardware-based computer-readable storage media (CRM) 208. The processor 206 can be a single-core processor or a multiple-core processor implemented with a homogenous or heterogenous core structure. The processor 206 may include a hardware-based processor implemented as hardware-based logic, circuitry, processing cores, or the like. In some aspects, functionalities of the processor 206 and other components of the mobile device 102 are provided via integrated processing, communication, or control systems (e.g., systems-on-chip), which may enable various operations of the mobile device 102. The one or more processors 206 can include, as non-limiting examples, a system-on-chip (SoC), an application processor (AP), a central processing unit (CPU), or a graphics processing unit (GPU). The processor 206 can execute the location estimator 108 to refine the location estimate 110 using UWB communication links.

The CRM 208 described herein excludes propagating signals. The CRM 208 may include any suitable hardware-based memory or storage device such as random-access memory (RAM), static RAM (SRAM), dynamic RAM (DRAM), non-volatile RAM (NVRAM), read-only memory (ROM), or Flash memory useable to store device data (not illustrated) of the mobile device 102. The device data includes an operating system 210, applications 212, user data, or multimedia data, which are executable by the processor 206 to enable refined location estimates using UWB communication links. In particular, the CRM 208 includes instructions that, when executed, direct the processor 206 to refine location estimates using UWB communication links. The operating system 210 generally manages hardware and software resources (e.g., the applications 212) of the portable electronic device 102 and provides common services for the applications 212. The operating system 210 and the applications 212 are generally executable by the processors 206 (e.g., an SoC, an AP, a CPU) to enable communications and user interaction with the mobile device 102. The operating system 210 and the applications 212 can also use the refined location estimates to provide improved functionalities, features, and services to users of the mobile device 102.

In aspects of refining location estimates using UWB communication links, the CRM 208 of the mobile device 102 may also include an instance of the location estimator 108. Alternatively, the location estimator 108 may be implemented in whole or part as hardware logic or circuitry integrated with or separate from other mobile-device components. Generally, the location estimator 108 can include information relating to estimating the current location of the mobile device 102 using data from the location sensors 106. The location estimator 108 also includes information relating to refining the current location estimate using UWB communication links to nearby mobile devices. The operations of the location estimator 108 are described in greater detail with respect to FIGS. 3-5.

Figure 3:
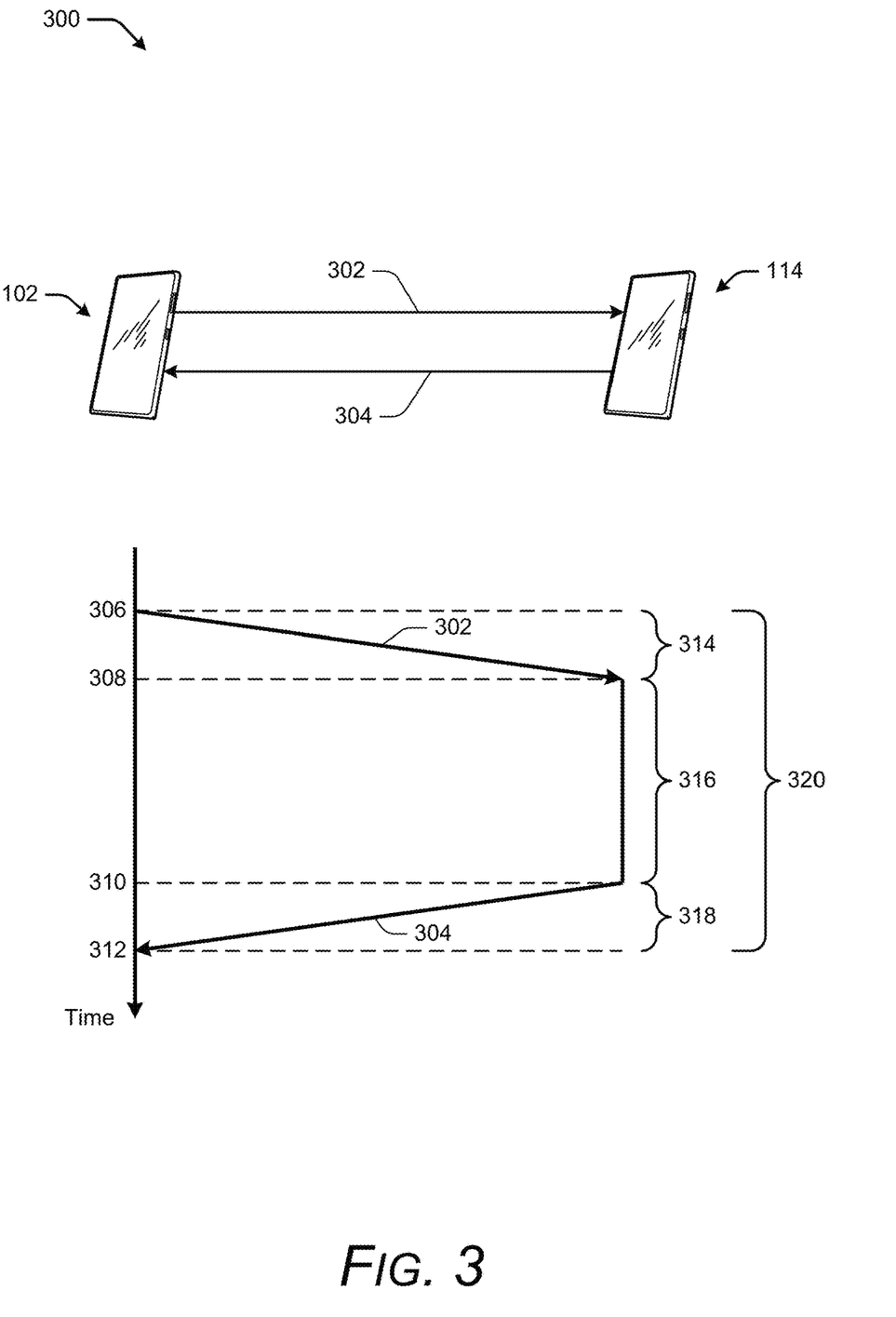
FIG. 3 illustrates an example diagram of generating a UWB communication link between mobile devices to assist in refining location estimates.

FIG. 3 illustrates an example diagram 300 of generating a UWB communication link between mobile devices to assist in refining location estimates. The mobile devices can include the mobile device 102 and the nearby mobile devices 114, 116, and 118 illustrated in FIG. 1. In this and other implementations, the mobile devices can include additional or different devices.

As described above, the mobile device 102 can establish a UWB communication link with the mobile device 114. To establish the UWB communication link, the mobile device 102 transmits or sends a first UWB signal 302 to the mobile device 114 to initiate a UWB handshake protocol. The first UWB signal 302 is transmitted by the mobile device 102 at a first time 306. The first UWB signal 302 is received by the mobile device 114 at a second time 308. The first UWB signal 302 takes a first interval 314 to reach the mobile device 114, representing the second time 308 minus the first time 306. The first interval 314 is proportional to the distance between the mobile device 102 and the mobile device 114.

The mobile device 114 processes the first UWB signal 302 and sends or transmits a second UWB signal 304 to the mobile device 102 in response to the first UWB signal 302. The second UWB signal 304 is transmitted by the mobile device 114 at a third time 310. The mobile device 114 takes a second interval 316, which this document refers to as the reply time, $T_{reply}$, to process the first UWB signal 302 and prepare the second UWB signal 304. The second interval 316 represents the third time 310 minus the second time 308.

The second UWB signal 304 is received by the mobile device 102 at a fourth time 312. The second UWB signal 304 takes a third interval 318 to reach the mobile device 102, representing the fourth time 312 minus the third time 310. The round-trip time (RTT) 320 represents the time it took the mobile device 102 to receive the second UWB signal 304 in response to the first UWB signal 302. The RTT 320 represents the sum of the first interval 314, the second interval 316, and the third interval 318. The location estimator 108 can determine the RTT 320 as the difference between the fourth time 312 minus the first time 306.

The location estimator 108 can determine the distance between the mobile device 102 and the mobile device 114 using the RTT 320. Specifically, the location estimator 108 can use the following equation (1) to determine the distance, d, to the mobile device 114:

$$d = \frac{c \times (RTT - T_{reply})}{2} \qquad (1)$$

where c represents the speed of light. The distance, d, represents the absolute distance between the mobile device 102 and the nearby mobile device 114. In some implementations, the location estimator 108 can know a priori the time it takes the mobile device 114 or similar types of devices to process the first UWB signal 302 and, thus, can estimate the reply time, $T_{reply}$. In other implementations, the location estimator 108 can use timestamp information provided by the mobile device 114 to estimate the reply time, $T_{reply}$. The timestamp information can include the second time 308 (e.g., when the first UWB signal 302 was received) and the third time 310 (e.g., when the second UWB signal 304 was transmitted).

The mobile device 114 can initiate a similar UWB handshake with the mobile device 102 to determine the distance between the devices. The mobile device 102 and the mobile device 114 can also initiate similar UWB handshakes with other nearby mobile devices (e.g., the mobile devices 116 and 118). As discussed above, the mobile device 114 can transmit, using the UWB communication link, the distance between itself and other mobile devices, a location estimate for itself, and a location estimate for other nearby mobile devices.

Figure 4:
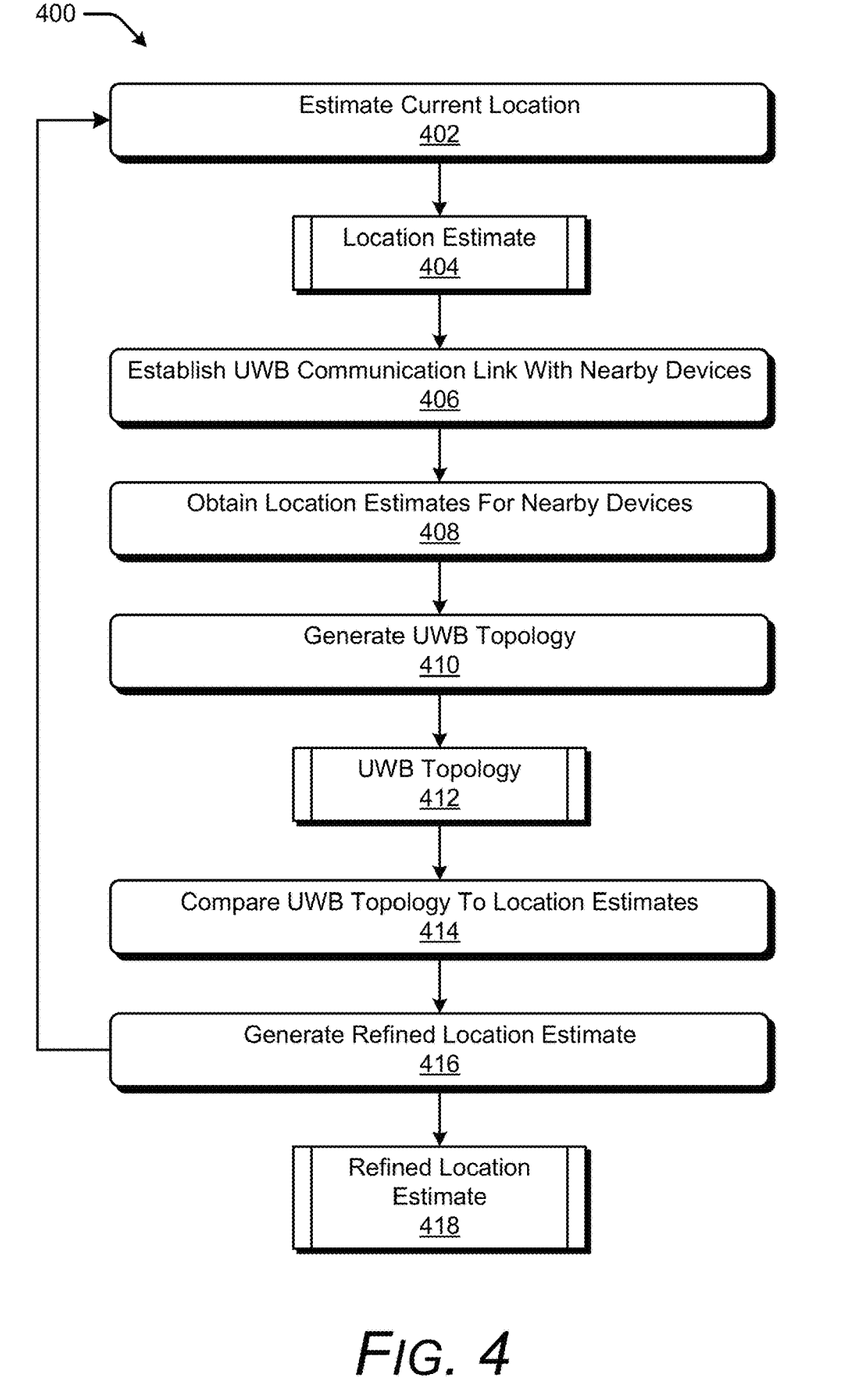
FIG. 4 illustrates an example flowchart to generate refined location estimates using UWB communication links.

FIG. 4 illustrates an example flowchart 400 to generate refined location estimates using UWB communication links. The mobile devices in the example flowchart 400 can include the mobile device 102 and the mobile device 114 illustrated in FIGS. 1 and 3. In this and other implementations, the mobile devices can include additional or different devices. The flowchart 400 can include additional or fewer operations than those illustrated in FIG. 4. Similarly, the operations of the flowchart 400 can be performed in a different order, skipped, and/or repeated in accordance with various aspects.

At 402, the location estimator 108 estimates, using the location sensor 106, a current location of the mobile device 102. The location sensor 106 can include a GPS or GNSS sensor that provides a location estimate 404 for the mobile device 102. The location estimate 404 provided by the location sensor 106 generally has an accuracy of several meters (e.g., 3 meters). If the mobile device 102 is located indoors or receives an occluded signal, the location estimate 404 has a lower accuracy (e.g., tens of meters). This accuracy level may result in the mobile device 102 mistaking that the user is located inside, as opposed to outside, a building (e.g., the user's home, a store, an office building). The mobile device 102 may also not correctly determine in which room or portion of a building (e.g., the user's home) that a user is located. If a user using a map application on the mobile device 102 for directions, the location estimate 404 may not place the user on the correct street, confusing the user.

At 406, the mobile device 102 establishes a respective UWB communication link with at least one nearby mobile device (e.g., the mobile devices 114, 116, and 118). As described with respect to FIG. 3, the mobile device 102 can determine the distance to the nearby mobile devices based on the RTT to establish the respective UWB communication links.

At 408, the mobile device 102 obtains location estimates for the nearby mobile devices. Like the mobile device 102, the location estimates for the nearby mobile devices are obtained using one or more location sensors. The mobile device 102 can also obtain the distances between the nearby mobile devices, which the nearby mobile devices similarly determined using respective UWB communication links. For example, the mobile device 102 can obtain location estimates from the nearby mobile devices over the respective UWB communication links. The mobile device 102 can also obtain other information (e.g., an identifier for the nearby mobile devices) from the nearby mobile devices. Alternatively, the mobile device 102 can obtain the location estimates and distances for the nearby mobile devices from an online database over a cellular or WLAN connection.

At 410, the location estimator 108 generates a UWB topology 412 that includes the relative locations of the mobile device 102 and the nearby mobile devices. The UWB topology 412 indicates the distance between the mobile device 102 and the nearby mobile devices. The UWB topology 412 also indicates the relative location of the mobile device 102 and the nearby mobile devices with respect to one another. The location estimator 108 can use multidimensional scaling to generate the UWB topology 412. The operations of the location estimator 108 to generate the UWB topology 412 are described in greater detail with respect to FIG. 5.

At 414, the location estimator 108 compares the relative locations of the UWB topology for the mobile device 102 and nearby mobile devices to the respective location estimates for the mobile device 102 and the nearby mobile devices. The location estimator 108 can find an optimal fit from placing the relative locations of the mobile devices in the UWB topology 412 onto the location estimates for the mobile devices by finding the maximum likelihood of fit for one or more orientation parameters. The orientation parameters can include at least one of a rotation, flip, or translation parameter. For example, the location estimator 108 can solve the function of equation (2):

$$\max_w \mathcal{L}(T_{LOC}, T_{UWB}; w = \{w_r, w_f, w_t\}) \tag{2}$$

where $T_{LOC}$ represents the location estimates for the mobile device 102 and the nearby mobile devices, $T_{UWB}$ represents the UWB topology 412, w represents the orientation parameters, $w_r$ represents the rotation parameter, $w_f$ represents the flip (e.g., mirroring) parameter, and $w_t$ represents the translation parameter.

At 416, the location estimator 108 generates the refined location estimate 418 for the mobile device 102. The refined location estimate 418 has greater accuracy than the location estimate 404. For example, the refined location estimate 418 can have an accuracy of less than a meter. The accuracy of the refined location estimate 418 generally improves as the number of nearby mobile devices included in the UWB topology 412 increases. In contrast, the location estimate 404 generally does not improve in relation to the presence of one or more nearby mobile devices. In some situations, if the UWB topology 412 includes three nearby mobile devices, a geometric margin of error for the refined location estimate 418 is less than half the geometric margin of error for the location estimate 404. If the UWB topology 412 includes at least ten nearby mobile devices, the refined location estimate 418 can have a geometric margin of error that is less than a meter.

Figure 5:
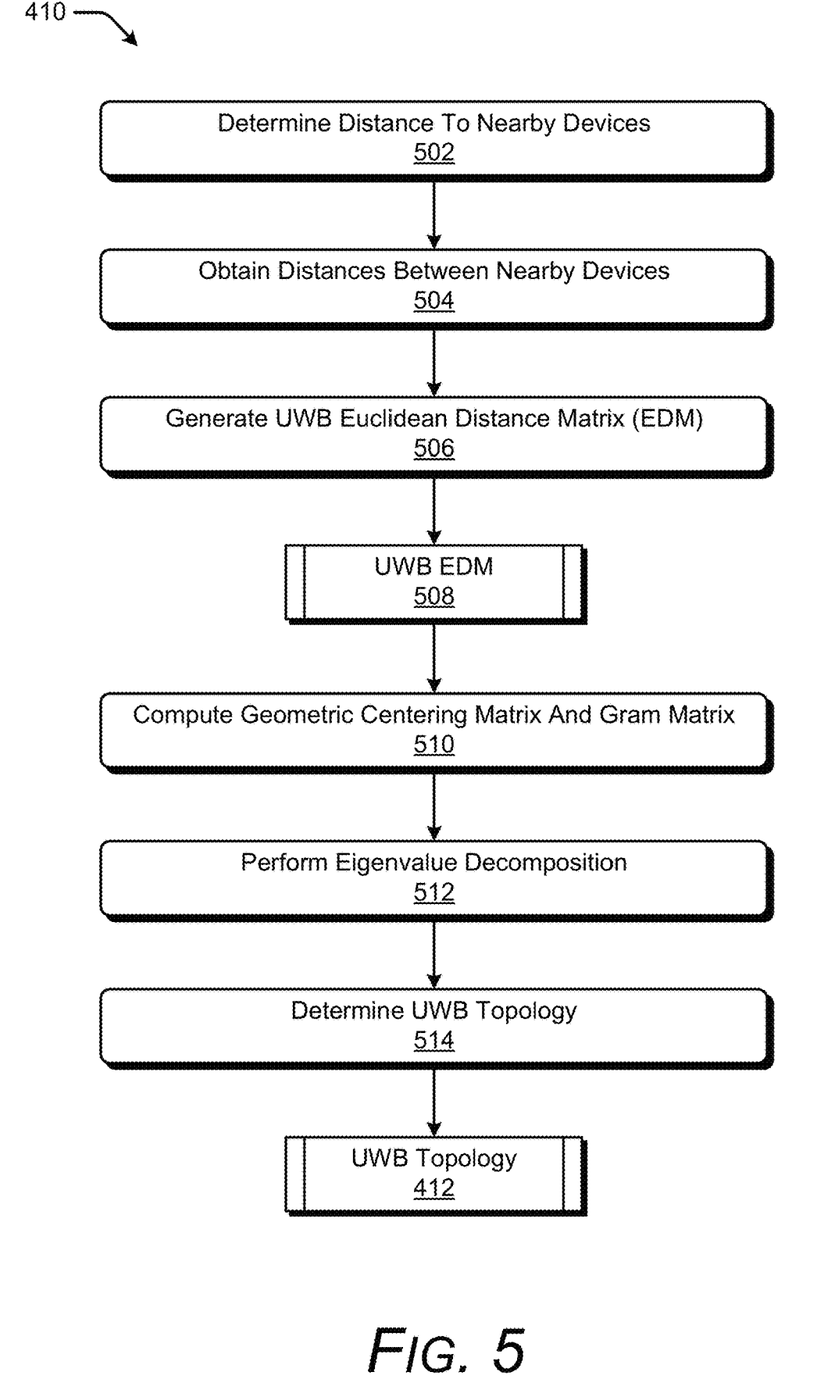
FIG. 5 illustrates an example flowchart to generate a UWB topology.

FIG. 5 illustrates an example flowchart 410 to generate the UWB topology 412. As an example, the location estimator 108 can perform the operations of the flowchart 410. The flowchart 410 can include additional or fewer operations than those illustrated in FIG. 5. Similarly, the operations of the flowchart 410 can be performed in a different order, skipped, and/or repeated in accordance with various aspects.

At 502, the location estimator 108 determines the distance from the mobile device 102 to nearby mobile devices (e.g., the mobile devices 114, 116, and 118). The mobile device 102 can use the UWB communication link between the mobile device 102 and the nearby mobile devices to calculate the distance. As discussed above, the location estimator 108 can use the RTT to establish the respective UWB communication links to determine the distance to a mobile device.

At 504, the location estimator 108 obtains the distance between the nearby mobile devices. As described above, the location estimator 108 can receive this distance data from one or more of the nearby mobile devices over the UWB communication link. In other examples, the location estimator 108 can obtain the distance data from an online database.

At 506, the location estimator 108 generates a UWB Euclidean distance matrix (EDM) 508 that includes the square of the distances between the mobile device 102 and the nearby mobile devices. The location estimator 108 may obtain multiple data points for the distance between two mobile devices in some implementations. The location estimator 108 can, for example, populate the UWB EDM 508 using an average of the multiple data points or the most recent data point. Consider an example of N devices located within range of the mobile device 102. The UWB EDM 508 for this example is illustrated in equation (3):

$$EDM(T) = \begin{bmatrix} 0 & d_{1,2}^2 & \cdots & d_{1,N}^2 \\ d_{2,1}^2 & 0 & \cdots & d_{2,N}^2 \\ \vdots & & \ddots & \vdots \\ d_{N,1}^2 & d_{N,2}^2 & \cdots & 0 \end{bmatrix} \quad (3)$$

where $d_{1,2}^2$ represents the square of the distance between the mobile device 102, $d_1$, and a first nearby mobile device, $d_2$. The elements of the UWB EDM 508 are non-negative because the distance values are non-negative and squared. The diagonal elements of the UWB EDM 508 have a value of zero because the distance between a device and itself is zero. In addition, the UWB EDM 508 is symmetric because the distance from device A to device B is the same as the distance from device B to device A.

At 510, the location estimator 108 can compute a geometric centering matrix, C, (e.g., a centering matrix) using the UWB EDM 508. The geometric centering matrix, C, is provided by equation (4):

$$C = I - \frac{1}{N} 11^T \quad (4)$$

where I represents an identity matrix of size N and $11^T$ represents an N by N matrix of ones.

The location estimator 108 then computes a gram matrix, G, (e.g., a Gramian matrix or Gramian) using the geometric centering matrix, C, and the UWB EDM 508, EDM(T). The gram matrix, G, is provided by following equation (5):

$$G = -0.5 * C * EDM(T) * C \quad (5)$$

At 512, the location estimator 108 performs an eigenvalue decomposition (EVD) (e.g., eigen decomposition, spectral decomposition) of the gram matrix, G, to generate eigenvalues, $\lambda_i$. The location estimator 108 can determine the eigenvalues, $\lambda_i$, using equation (6):

$$U, [\lambda_i]_{i=1}^N = EVD(G) \quad (6)$$

At 514, the location estimator 108 determines, using the eigenvalues, an estimate of the UWB topology 412, $T_{UWB}$. The location estimator 108 determines the UWB topology using equation (7):

$$T_{UWB} = [\mathrm{diag}(\sqrt{\lambda_1}, \ldots, \sqrt{\lambda_d}), 0_{d \times (N-d)}] U^T \quad (7)$$

Figure 6:
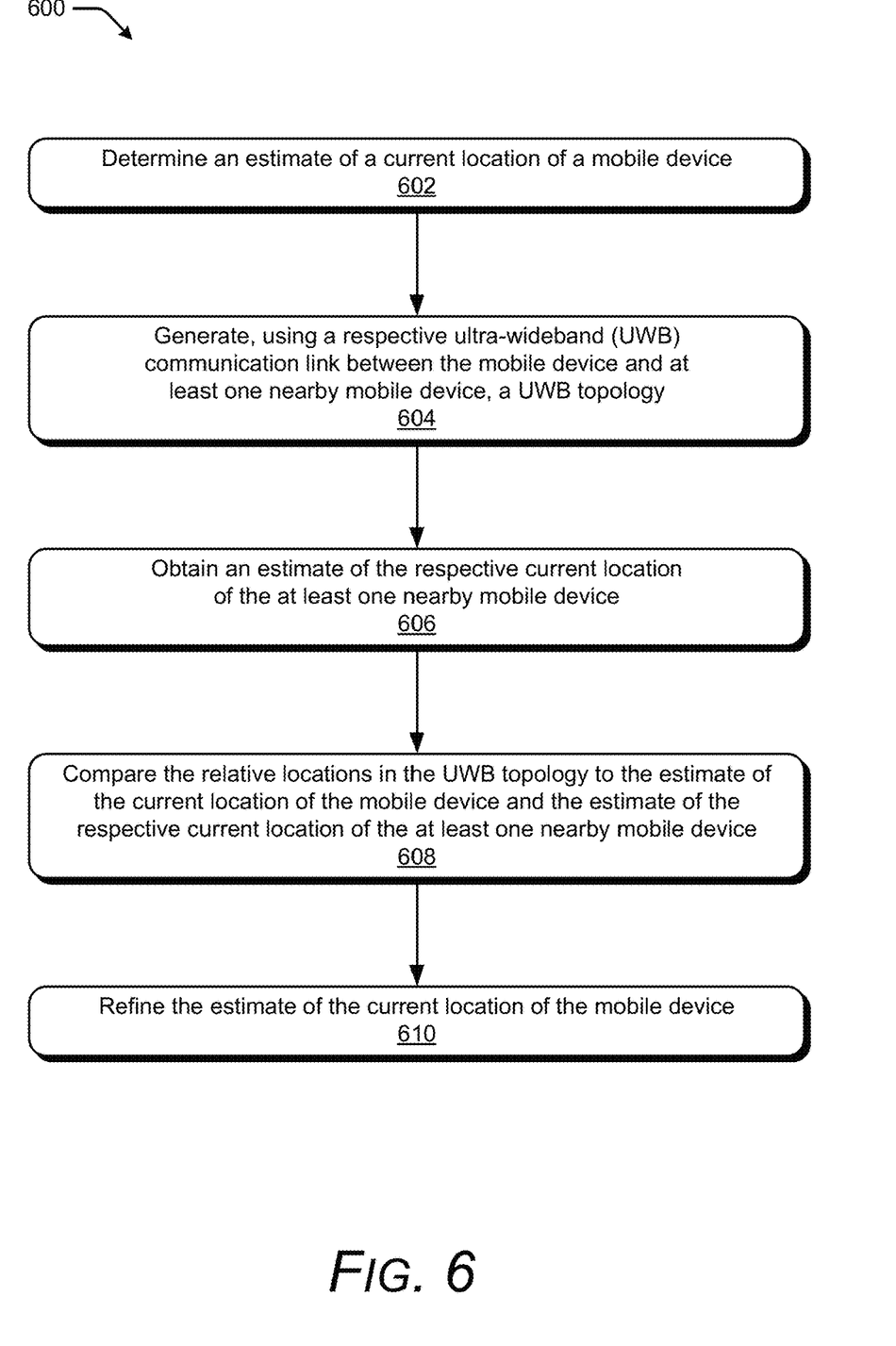
FIG. 6 illustrates example operations of a mobile device to generate refined location estimates using UWB communication links.

FIG. 6 illustrates example operations 600 of a mobile device to generate refined location estimates using UWB communication links. The operations 600 are described in the context of the mobile device 102 of FIG. 1. The flowchart 600 can include additional or fewer operations than those illustrated in FIG. 6. Similarly, the operations of the flowchart 600 can be performed in a different order, skipped, and/or repeated in accordance with various aspects.

At 602, an estimate of a current location of a mobile device is determined using a location sensor. For example, the mobile device 102 can determine, using the location sensor 106, the location estimate 110. The location sensor 106 can include a GPS or GNSS sensor to provide coordinates for the location of the mobile device 102. Such location sensors 106 are generally accurate up to about 3 meters, but the accuracy can be lower in non-ideal conditions (e.g., indoors, overhead foliage, high-density urban areas, and so forth).

At 604, a UWB topology is generated using a respective UWB communication link between the mobile device and at least one nearby mobile device. The UWB topology includes the relative locations of the mobile device and the nearby mobile devices. For example, the location estimator 108 of the mobile device 102 can generate the UWB topology 412 using respective UWB communication links with the nearby mobile devices. The UWB topology 412 indicates the relative locations of the mobile device 102 and the nearby mobile devices. The nearby mobile devices include devices that do not have a fixed or static location.

As described with respect to FIG. 3, the mobile device 102 and the nearby mobile devices can determine the distance between devices using the RTT to establish the UWB communication link. The mobile device 102 can obtain the distances between the nearby mobile devices over one or more UWB communication links from one or more of the nearby mobile devices. In other implementations, the mobile device 102 can obtain the distances between the nearby mobile devices from an online database. An example of this operation is described above with respect to FIG. 5.

At 606, an estimate of the respective current location of the nearby mobile devices is obtained. For example, the mobile device 102 can obtain an estimate of the respective current location of the nearby mobile devices using the UWB communication links. As another example, the mobile device 102 can obtain the estimate of the respective current location of the nearby mobile devices from an online database.

At 608, the relative locations in the UWB topology are compared to the estimate of the current location of the mobile device and the estimate of the respective current location of the nearby mobile devices. For example, the location estimator 108 can compare the relative locations of the mobile devices in the UWB topology 412 to the estimate of the current location for the mobile device 102 and the nearby mobile devices. This document describes this comparison operation 608 in greater detail with respect to FIG. 4.

At 610, the estimate of the current location of the mobile device is refined. The refined location estimate has greater accuracy than the estimate of the current location of the mobile device. For example, the location estimator 108 can refine the location estimate 110 to generate the refined location estimate 418. Depending on the number of nearby mobile devices included in the UWB topology 412, the refined location estimate 418 has greater accuracy than the location estimate 110.

The mobile device 102 and applications thereon can use the refined location estimate 418 to provide new and improved functionality. For example, the mobile device 102 can provide improved navigation functionality by providing more accurate indications of a current location of the mobile device 102. Similarly, the mobile device 102 can use the refined location estimate 418 to identify in which lane of a roadway a vehicle is traveling and provide notifications that the user may need to change lanes to continue the desired navigation. As another example, the refined location estimate 418 can be used to improve home automation and home routine scheduling by providing improved estimates in which room or part of the home the mobile device is located. Similarly, the mobile device 102 can use the refined location estimate 418 to provide indoor navigation. In yet another example, the mobile device 102 can use the refined location estimate 418 to provide alerts and suggested functionality or services that are more appropriate based on a location or context of the mobile device 102.

While various configurations and methods for generating refined location estimates using ultra-wideband (UWB) communication links have been described in language specific to certain features and/or methods, it is to be understood that the subject of the appended claims is not necessarily limited to the specific features or methods described. Rather, the specific features and methods are disclosed as non-limiting examples of generating refined location estimates using ultra-wideband (UWB) communication links. Further, although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples.

What is claimed is:

1. A method comprising:
   determining, by a first mobile device and using a location sensor, an estimate of a current location of the first mobile device;
   generating, by the first mobile device and using a respective ultra-wideband (UWB) communication link between the first mobile device and at least one nearby mobile device, a UWB topology that includes relative locations of:
   the first mobile device; and
   the at least one nearby mobile device;
   obtaining, by the first mobile device, an estimate of a respective current location of the at least one nearby mobile device;
   comparing, by the first mobile device and using at least one orientation parameter, the relative locations in the UWB topology to the estimate of the respective current locations of:
   the first mobile device; and
   the at least one nearby mobile device; and
   refining, by the first mobile device and based on the comparing, the estimate of the current location of the first mobile device, the refined estimate of the current location having a greater accuracy than the estimate of the current location of the first mobile device.

2. The method of claim 1, further comprising generating the UWB topology by:
   determining, using the respective UWB communication link between the first mobile device and at least two nearby mobile devices, a distance from the first mobile device to each of the at least two nearby mobile devices;
   obtaining a distance between each of the at least two nearby mobile devices;
   generating, by the first mobile device, an UWB Euclidean distance matrix (EDM) that includes a square of the distance from the first mobile device to each of the at least two nearby mobile devices and a square of the distance between each of the at least two nearby mobile devices;
   determining, using the UWB EDM, a geometric centering matrix;
   determining, using the geometric centering matrix and the UWB EDM, a gram matrix;
   performing an eigenvalue decomposition of the gram matrix to generate eigenvalues; and
   determining, using the eigenvalues, the UWB topology.

3. The method of claim 1, further comprising determining a distance from the first mobile device to each of the at least one nearby mobile device by:
   determining a respective round-trip time for a respective UWB handshake between the first mobile device and each of the at least one nearby mobile device, the respective UWB handshake including:
   transmitting, by the first mobile device, a respective first UWB signal to each of the at least one nearby mobile device; and
   receiving, by the first mobile device and responsive to the respective first UWB signal, a respective second UWB signal from each of the at least one nearby mobile device to the first mobile device;
   determining a respective reply time for each of the at least one nearby mobile device to prepare and send the respective second UWB signal; and
   determining the distance from the first mobile device to each of the at least one nearby mobile device as a function of the respective round-trip time minus the respective reply time.

4. The method of claim 1, wherein the estimate of the current location of the first mobile device is determined using at least one of a global positioning system (GPS) sensor or a global navigation satellite system (GNSS) sensor of the first mobile device.

5. The method of claim 1, wherein the first mobile device comprises a mobile phone, a computerized watch, a tablet device, a wearable device, a vehicle-based computing system, a portable video game console, or a laptop computer.

6. The method of claim 1, wherein the at least one nearby mobile device does not have a fixed location.

7. The method of claim 1, wherein:
   the accuracy of the refined estimate of the current location of the first mobile device corresponds to a first geometric margin of error;
   an accuracy of the estimate of the current location of the first mobile device corresponds to a second geometric margin of error; and
   the first geometric margin of error of the refined estimate of the current location of the first mobile device is less than half the second geometric margin of error of the current location of the first mobile device.

8. The method of claim 1, wherein the orientation parameter is at least one of a rotation parameter, a flip parameter, or a translation parameter.

9. A mobile device comprising:
   a location sensor configured to determine an estimate of a current location of the first mobile device;
   an ultra-wideband (UWB) transceiver configured to establish respective UWB communication links between the first mobile device and at least one nearby mobile device; and
   one or more processors configured to:
   generate, using the respective UWB communication links, a UWB topology that includes relative locations of:
   the first mobile device; and
   the at least one nearby mobile device;
   obtain an estimate of the respective current location of the at least one nearby mobile device;
   compare, using at least one orientation parameter, the relative locations in the UWB topology to the estimate of the respective current locations of:
   the mobile device; and
   the first at least one nearby mobile device; and
   refine the estimate of the current location of the first mobile device, the refined estimate of the current location having a greater accuracy than the estimate of the current location of the first mobile device.

10. A hardware-based computer-readable storage medium comprising instructions that, when executed, direct one or more processors of a first mobile device to:
- determine, using a location sensor, an estimate of a current location of the first mobile device;
- generate, using a respective ultra-wideband (UWB) communication link between the first mobile device and at least one nearby mobile device, a UWB topology that includes relative locations of:
  - the first mobile device; and
  - the at least one nearby mobile device;
- obtain an estimate of the respective current location of the at least one nearby mobile device;
- compare, using at least one orientation parameter, the relative locations in the UWB topology to the estimate of the respective current locations of:
  - the first mobile device; and
  - the at least one nearby mobile device; and
- refine, based on the comparison, the estimate of the current location of the first mobile device, the refined estimate of the current location having a greater accuracy than the estimate of the current location of the first mobile device.

\* \* \* \* \*